Feb. 19, 1952        P. H. TAYLOR        2,586,117

ACTUATING ELEMENT FOR RECIPROCABLE MACHINE ELEMENTS

Filed Aug. 19, 1949        3 Sheets-Sheet 1

INVENTOR.
Paul H. Taylor
BY Edwin B. Gary
Attorney.

Feb. 19, 1952 P. H. TAYLOR 2,586,117
ACTUATING ELEMENT FOR RECIPROCABLE MACHINE ELEMENTS
Filed Aug. 19, 1949 3 Sheets-Sheet 3

INVENTOR.
Paul H. Taylor
BY Edwin B. Gary
Attorney.

Patented Feb. 19, 1952

2,586,117

UNITED STATES PATENT OFFICE 2,586,117

ACTUATING ELEMENT FOR RECIPROCABLE MACHINE ELEMENTS

Paul H. Taylor, North Tonawanda, N. Y., assignor to Wales-Strippit Corporation, North Tonawanda, N. Y.

Application August 19, 1949, Serial No. 111,233

20 Claims. (Cl. 74—107)

This invention relates to mechanisms of the kind which involve the translation of a rotary movement into a rectilinear movement.

In various types of machines the movement of a pivotally mounted, or rotating, element is frequently utilized to impart a rectilinear movement to a driven element. Usually the pivotally mounted, or rotating, element has consisted of a pinion which is connected to the source of power while the driven element has consisted of a rack. Such gearing, however, has a number of objections. For example, it has a constant mechanical advantage, whereas many machines would operate more satisfactorily if the motion translating mechanisms employed had a variable mechanical advantage which would compensate for the variable load conditions characteristic of the mode of operation of the particular machines. Gearing of the rack and pinion type also has the objection that it is costly and must be made specially for each particular machine on which it is to be used. Moreover, there is some play between the mating teeth of the gears and this necessitates the provision of a certain amount of override to insure that the driven element will be moved the required distance. Such play, in turn, is objectionable particularly in the precision manufacture of machine elements where the travel of the elements must be accurately controlled.

The principal object of the present invention, therefore, is to overcome the above objections, this object contemplating a movement translating mechanism which is so designed that the use of gearing is avoided and which is characterized by a mechanical advantage which varies directly in accordance with the requirement of the machine with which the mechanism is associated.

Another object is to provide a translating mechanism of the character generally described which will provide the desired mechanical advantage at the desired portion of travel of the driven element.

A related object is to provide a variable mechanical advantage in a linkage system which matches the requirements of the driven element.

A further object of the invention is to provide a translating mechanism which is available to provide a past dead center lock-up for the driven element.

A still further object is to provide a translating mechanism which is free of lost motion between it and the machine or device to be controlled.

A still further object is a translating mechanism characterized by features which adapt it particularly for use in connection with driven elements of a cylindrical shape.

A still further object is a clutch wherein, in order to insure quiet operation, provision is made for permitting idling movement of the driving element without contact between the cooperating surfaces of the driving element and the driven element.

A still further object is a novel design and arrangement of the parts of the translating mechanism, whereby to facilitate assembly and disassembly of the parts and insure simplicity and economy in construction.

The invention is illustrated in the accompanying drawings, wherein.

Figure 1:
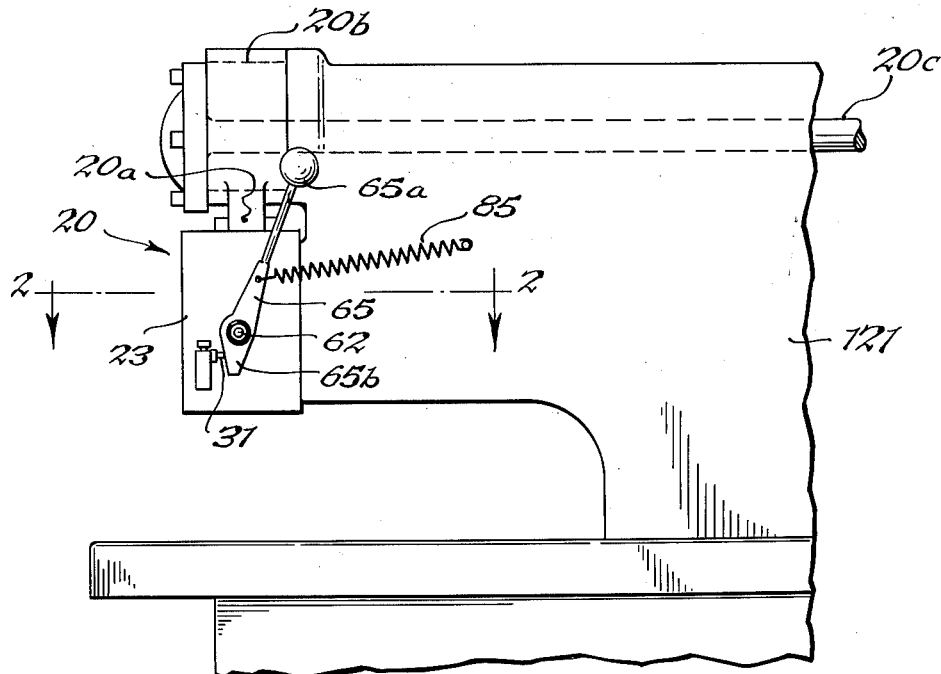
Figure 1 is a side elevational view (partial) of a press-working machine tool showing a translating mechanism embodying the features of the invention associated therewith.

The translating mechanism of the invention is characterized by features which adapt it for various purposes and for various types of machines, devices and mechanisms wherein the rotary, or pivotal, movement of a driving element is transmitted to a driven element in such a manner that the latter is caused to move rectilinearly.

By way of example, the translating mechanism is illustrated in connection with a press-working machine tool 121 (Figure 1), there being a clutch 20 for connecting and disconnecting the press-working tool (ram or the like) to a pitman 20a which, at its upper end, is carried on an eccentric 20b on the power shaft 20c of the machine.

Figure 4:
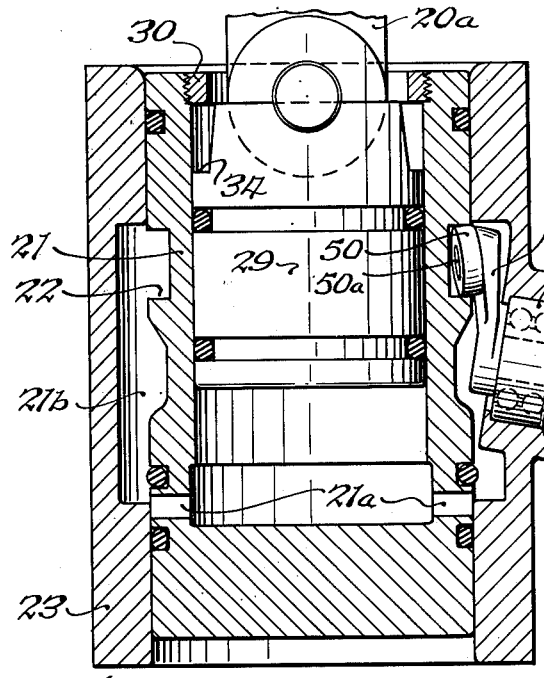
Figure 4 is a sectional view taken along line 4—4 of Figure 2.

The clutch 20 may, if desired, be of the type disclosed in either application Serial No. 752,433, now Patent No. 2,528,198, or Serial No. 73,271, assigned to my interests. As illustrated, however, it is of the type disclosed in the latter application, having a piston 29 which is connected to, and which is actuated by, the pitman 20a (Figure 4). The piston 29 is reciprocated within a reciprocable cylinder 21 which is closed at its lower end and which, in the embodiment illustrated, constitutes the ram of the machine. Ports 21a which are formed in the cylinder 21 permit, or prevent, the flow of a hydraulic fluid between a reservoir 21b in the stationary housing 23 of the clutch and the interior of the cylinder 21, depending upon the position of the cylinder 21 in the housing. In this connection, it will be apparent that when the cylinder 21 occupies the position shown in Figure 4, the piston 29 may reciprocate therein without its movement being transmitted to the ram, the ports 21a permitting the hydraulic fluid to course back and forth through the ports 21a between the interior of the cylinder 21 and the reservoir 21b. It will also be apparent that any downward movement of the cylinder 21 which results in closing the ports 21a will result in trapping of hydraulic fluid between the piston 29 and cylinder 21 so that the movement of the piston will be transmitted to the ram to cause the latter to perform a working stroke. Retractive movements of the cylinder 21, upon completion of the working strokes, are effected by engagement of a shoulder 34 on the piston 29 with a lifting ring 30 threadedly secured in the upper, open end of the cylinder, the piston lifting the cylinder 21 to a position in which the ports 21a communicate with the reservoir 21b as it approaches and reaches the upper limit of its range of movement.

Figure 2:
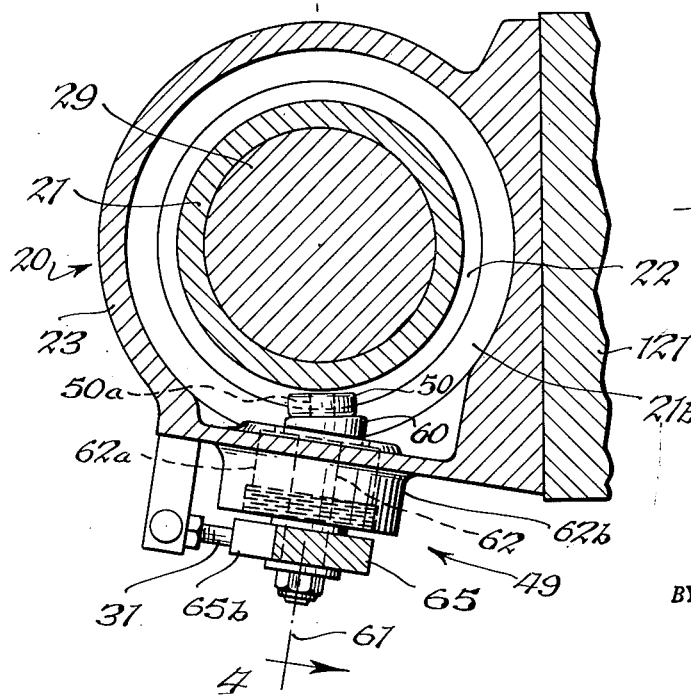
Figure 2 is an enlarged transverse cross-section through the translating mechanism and is taken along line 2—2 of Figure 1.
Figure 3:
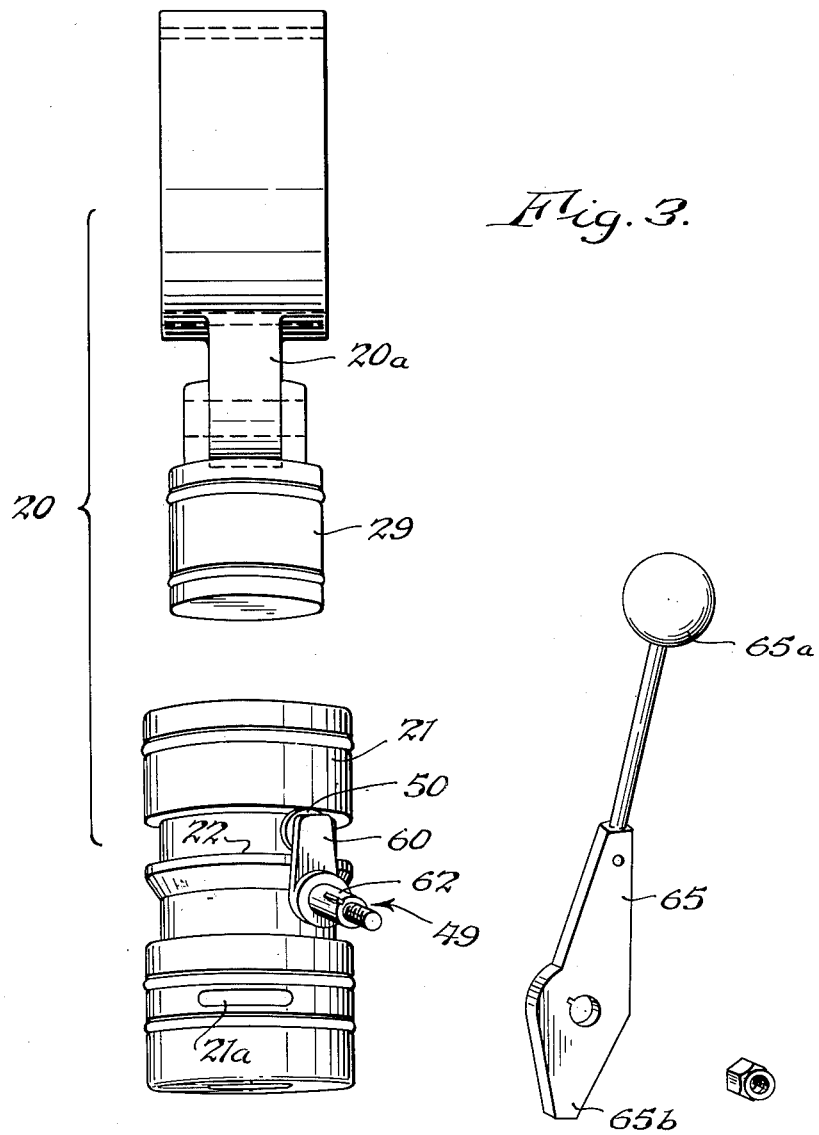
Figure 3 is an exploded view of the translating mechanism.

In accordance with the invention, the translating mechanism, which is indicated generally at 49, is associated with the cylinder 21 of the clutch 20 in such a manner that is may be availed of to positively initiate movement of the cylinder 21 in a direction to effect closing of the ports 21a when it is desired to operate the ram of the machine. To this end the translating mechanism includes an arm 60 which carries a roller 50 and which is carried by a shaft 62, the latter being journalled in bearings 62a in a boss 62b formed on the housing 23. Referring to Figures 2 and 4, it will be noted that the shaft 62 is mounted so that the axis 61 thereof is inclined upwardly in the direction of the cylinder 21 and to one side of the axis of the said cylinder. Preferably the arm 60 is formed so that in the uppermost position of the roller 50, as shown in Figure 2, the axis of the pin 50a on which the roller is journalled extends radially toward the axis of the cylinder 21. The mounting of the arm 60 and the roller 50 in the manner described insures that the roller, for a predetermined range of movement of the arm 60, will travel along a helical path of a diameter substantially the same as that of the cylinder 21.

The roller 50 normally occupies an annular channel 22 which is formed in the cylinder 21 and is preferably slightly crowned so that it may rock somewhat as it follows the channel 22 in response to the movement of the arm 60. At its outer end, the shaft 62 carries an actuating arm 65 which in turn carries a handle 65a. A spring 85 having one end connected to the machine frame and the other end connected to the arm 65 is normally operative to hold the arm in the position shown in Figure 1, in which position a tail-piece 65b on the arm abuts an adjustable stop 31 and in which position the arm 60 holds the roller 50 in a position in which it holds the cylinder 21 in its retracted position (see Figures 2 and 4). To positively initiate movement of the cylinder 21 downwardly and thereby close the ports 21a, the arm 65 is moved in a counter-clockwise direction. Owing to the mounting of the arm 60 in the manner described, the roller 50 will follow the channel 22, acting against the lower wall of the channel, as the arm 60 moves in a counterclockwise direction to the position shown in Figure 5, to move the cylinder 21 downwardly. Obviously, for any cylindrical or contoured member and any degree of stroke, the parts may be designed to generate the required path without departing from the scope or spirit of the invention. As soon as the ports 21a are closed, the hydraulic fluid trapped between the piston 29 and the cylinder 21 will positively connect the piston and cylinder so that during the remainder of the movement of the piston its movement will be transmitted to the cylinder 21 through the trapped hydraulic fluid. During the return stroke of the piston 29, the latter, acting against the lifting ring 30 will carry he cylinder 21 with it.

Figure 4A:
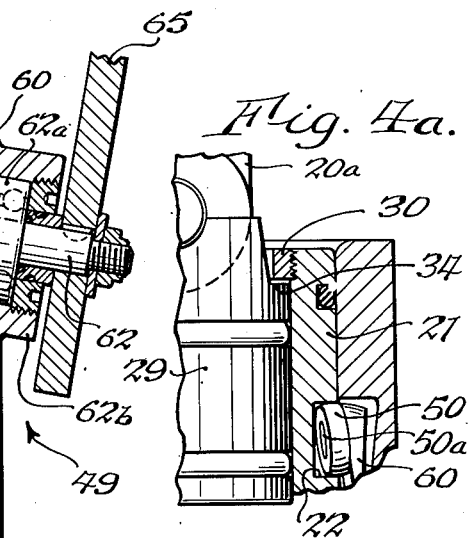
Figure 4a is a similar view (fragmentary) showing a different relation between the translating mechanism and the associated parts of the machine.

During idling periods of the machine, the roller 50, as noted, holds the cylinder 21 at the upper limit of its range of movement while the piston 29 reciprocates in the cylinder 21 and while the hydraulic fluid flows back and forth between the cylinder and the reservoir 21b. In accordance with the invention, the translating mechanism is utilized to support the cylinder 21 in a position such that the shoulder 34 on the piston 29 will not engage the lifting ring 30 and produce an objectionable tapping noise. Referring, in the connection to Figure 4a, it will be noted that there is a slight clearance between the shoulder 34 of the piston 29 and the lifting ring 30, the piston being shown at the upper limit of its range of movement. The mechanism is so designed that as the cylinder 21 reaches the upper limit to which it is carried by the piston 29 acting against the lifting ring 30 (the position at which the piston reaches dead center), the spring 85 acting upon the arm 65, will be operative to turn the latter in a clockwise direction to the position shown in Figure 1. Thereby the arm 60 is turned in a clockwise direction and through the roller is operative to lift the cylinder 21 so that it will be out of contact with the piston. In this connection it will be noted that owing to the angular position of the arm 60, the resilient force exercised by the spring 85 and exerted on the arm 65 is greatly increased to apply a strong lifting force to the cylinder 21 in lifting it to the position shown in Figures 4 and 4a. Preferably, the mechanism is so designed that the roller arm 60 will be caused to pass slightly beyond the dead center position to thereby provide a mechanical lock-up for the cylinder 21.

Referring to Figures 1 and 4, it will be seen that upon slight movement of the actuating arm 65 in a counterclockwise direction, the cylinder 21, or ram, will first be moved upwardly past dead center and then downwardly until the piston 29 engages the lifter ring 30 shown in Figures 4 and 4a. Owing to the counteracting spring 85 and the normal friction of the ram 21, movement beyond this point will be difficult for the operator except in the proper position and sequence of operation of the clutch elements. The proper time for movement of the ram 21 to effect a full stroke of the ram is at the instant the piston 29 has reached the top of its stroke and is starting downwardly again. In the downward travel of the piston 29, the normal friction offered by cylinder 21 is about the same as the frictional resistance which the housing 23 offers to the downward movement of the cylinder 21. Hence, as the piston 29 starts downwardly in its cycle, frictional forces being substantially zero, the operator can easily continue to move the handle 65a in a counterclockwise direction as it is only necessary to overcome the low resilient force exercised by the spring 85. The operator, therefore, rotates handle 65a counterclockwise in time with the machine trapping hydraulic fluid between piston 29 and ram 21, as described. Upon the return stroke of the piston 29, the engagement of the lifter ring 30 with the ram causes the latter to move upwardly and the operator, by easing the handle load he is applying, allows the handle 65a to rotate in accordance with the movement of the piston 29 and ram 21. As piston 29 reaches the top of its reciprocatory stroke, the resilient force of spring 85 applied through arm 65 to arm 60 causes the latter to continue to rotate in a clockwise direction, thereby lifting ram 21 further so that lifter ring 30 will be held out of contact with the reciprocating piston 29. Tapping noises which would otherwise occur as a result of engagement between the piston and the lifter ring are thus prevented.

Figures 5, 6:
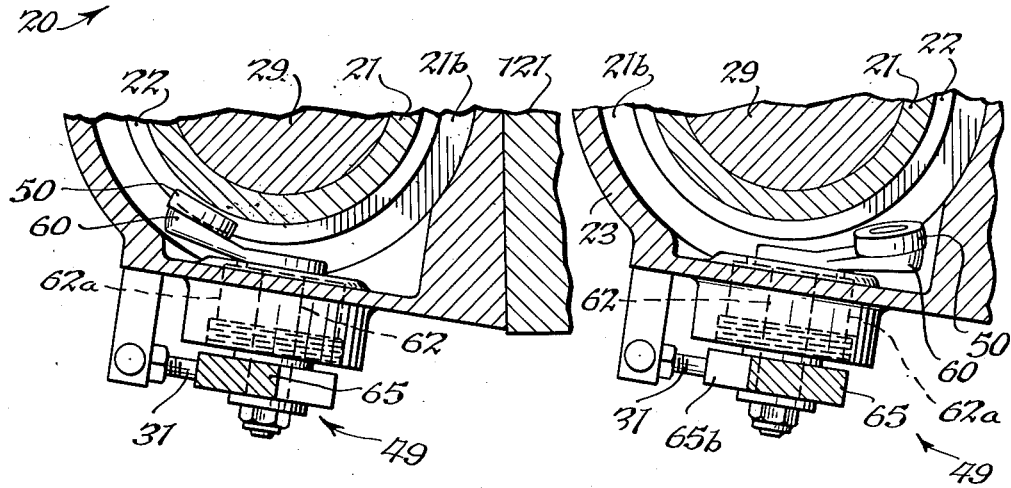
Figures 5 and 6 are views (fragmentary) similar to Figure 2 illustrating different positions of the parts of the translating mechanism.

From the foregoing, it will be apparent that the translating mechanism described has the advantage that it provides a mechanical means for positively controlling the ram 21. The use of heavy rams such as are required when the weight of the rams is relied upon to effect the desired downward movement is avoided together with the attendant disadvantages of low speed operation, high noise level and increased wear. Use of the translating mechanism enables the ram to be locked against downward movement, thereby providing a highly desirable safety feature. In addition to the foregoing advantages, the mounting of the shaft 62 and the roller 50 in the manner described has the advantage that assembling and disassembling operations are facilitated. Referring in this connection to Figure 6, it will be noted that the roller arm 60 has been moved to a position in which the roller is located out of and wholly clear of the channel 22. The roller arm 60 may be moved to the position shown by backing off the set-screw of the stop 31 shown in Figure 1 and turning the handle 65a in a clockwise direction. This arrangement provides a simple method of connecting the roller 50 to and disconnecting it from the ram 21.

Although the translating mechanism has been described in connection with a specific type of clutch for a pressworking machine, it is to be understood that this is intended for purposes of illustration only and that the advantages of the invention may be attained by the use of the translating mechanism in connection with various other kinds of devices, machines and mechanisms.

I claim as my invention:

1. An actuating mechanism for an element to be moved rectilinearly, said element being formed with a curved surface extending in a direction substantially normal to the direction of movement of said element, and pivotally mounted means for engaging said surface, said means having a skewed axis with respect to the direction of movement of said element and being operative as it turns to move said element while maintaining substantially the same degree of engagement with said surface over its arc of travel.

2. An actuating mechanism for an element to be moved rectilinearly, said element being formed with a curved channel which extends at an angle with respect to the direction of movement of said element, a roller which occupies said channel, a rotatably mounted arm having a pivotal axis skewed with respect to the direction of movement of the element, whereby said roller generates a path as it moves which follows generally the curvature of said channel, and means for turning said arm.

3. An actuating mechanism for an element to be moved rectilinearly, said element being formed with a curved channel which extends at an angle with respect to the direction of movement of said element, a roller which occupies said channel, an arm which carries said roller, a shaft which carries said arm, said shaft being mounted on a skewed axis with respect to the direction of movement of said element, whereby said roller will follow generally the curvature of said channel over its arc of travel, and means for turning said shaft.

4. An actuating mechanism for a cylindrical element which is mounted for axial movement in a housing, said element being formed with a curved surface which extends at an angle with respect to the direction of movement of said element, means pivotally mounted askew on said housing which engages said surface, whereby said means generates a helix as it turns and in so doing follows generally the curvature of said surface, and means for actuating said pivotally mounted means.

5. An actuating mechanism for a cylindrical element which is mounted for axial movement in a housing, the exterior of said element being formed with a channel which follows the curvature of said element and which extends crosswise with respect to the direction of movement of said element, a roller which occupies said channel, an arm which carries said roller, a shaft to which said arm is fixed, and means for turning said shaft, said shaft being mounted on a skewed axis with respect to the axis of said element, whereby said roller generates a portion of a helical path within said channel as said element is actuated, and means for turning said shaft.

6. An actuating mechanism for a cylindrical element which is mounted for axial movement in a housing, the exterior of said element being formed with a channel which follows the curvature of said element and which extends crosswise with respect to the direction of movement of said element, an arm located within said housing and having a laterally extending end which occupies said channel, a shaft which is journalled on a skewed axis in said housing and to the inner end of which said arm is secured, whereby said laterally extending end moves axially and circumferentially as said first mentioned arm is turned by said shaft, and a second arm secured to the other end of said shaft exteriorly of said housing for turning said shaft.

7. An actuating mechanism for a cylindrical element which is mounted for axial movement in a housing, the exterior of said element being formed with a channel which follows the curvature of said element and which extends crosswise with respect to the direction of movement of said element, a roller which occupies said channel, an arm which is located within said housing and the outer end of which carries said roller, a shaft journalled on a skewed axis in said housing and to which the inner end of said arm is secured, whereby said laterally extending end moves axially and circumferentially as said first mentioned arm is turned by said shaft, and a second arm secured to said shaft exteriorly of said housing for turning said shaft.

8. An actuating mechanism for a cylindrical element which is mounted for axial movement in a guiding structure, said element being formed with a circumferentially extending channel, an arm having a lateral extension which occupies said channel, a shaft to which said arm is secured, means for turning said shaft, and a skewed mounting for said shaft in said guiding structure so that as said arm pivots about the axis of said shaft said lateral extension will traverse a substantially helical path and in so doing maintain contact with the walls of said channel.

9. An actuating mechanism for a cylindrical element which is mounted for axial movement in a guiding structure, said element being formed with circumferentially extending channel, a roller which occupies said channel, an arm which carries said roller, a shaft to which said arm is secured, a skewed turning said shaft, and means for mounting for said shaft in said guiding structure so that as said arm pivots about the axis of said shaft said roller will traverse a substantially helical path and in so doing follow the curved walls of said channel.

10. An actuating mechanism for a cylindrical element which is mounted for axial movement in a guiding structure, said element being formed with a circumferentially extending channel, an arm having a lateral extension which occupies said channel, a shaft to which said arm is fixed, means for turning said shaft, and a skewed mounting for said shaft in said guiding structure so that as said arm pivots about the axis of said shaft in one direction, and between predetermined limits, said lateral extension will traverse a substantially helical path and in so doing follow the curved walls of said channel and as said arm pivots about the axis of said shaft in the opposite direction, said lateral extension will leave and move clear of said channel.

11. An actuating mechanism for a cylindrical element which is mounted for axial movement in a guiding structure, said element being formed with a circumferentially extending channel, a roller which occupies said channel, an arm which carries said roller, a shaft to which said arm is fixed, a skewed turning said shaft, means for mounting for said shaft in said guiding structure so that as said arm pivots about the axis of said shaft in one direction, and between predetermined limits, said roller will traverse a substantially helical path and in so doing follow the curved walls of said channel and as said arm pivots about the axis of said shaft in the opposite direction said roller will leave and move clear of said channel, and stop means for normally preventing movement of said arm except between said predetermined limits.

12. An actuating mechanism for an element which is movable rectilinearly and which is associated with a member which is movable back and forth between predetermined limits and which may be connected to said element to cause the latter to move with it, said element and member having cooperating surfaces which are engaged when said member moves said element in one direction, and a radial arm for moving said element in one direction, said arm also being operative to move said element in the opposite direction so that said member may idle between said limits without contact between said surfaces.

13. The combination with a clutch having a driven element which may reciprocate, said element having a transversely extending contact surface, and a cooperating, reciprocating driving element for moving said driven element back and forth between predetermined limits, said elements having cooperating areas which are engaged when the driving element is moving the driven element in one direction, of a pivotally mounted arm having an end which engages said contact surface, and means for turning said arm so that said driven element may be moved beyond the limit to which it is moved in said direction by said driving element, whereby said driving element may idle without contact between said areas.

14. The combination with a clutch having a driven element which may reciprocate, said element having a transversely extending channel and a cooperating, reciprocating driving element for moving said driven element back and forth between predetermined limits, said elements having cooperating surfaces which are engaged when the driving element is moving the driven element in one direction, of a roller which occupies said channel, an arm which carries said roller, and a shaft for turning said arm so that said driven element may be moved beyond the limit to which is moved in said direction by said driving element, whereby said driving element may idle without contact between said surfaces.

15. The combination with a clutch having a cylindrical driven element which may reciprocate, said element having a circumferentially extending channel and a cooperating, reciprocating driving element for moving said driven element back and forth between predetermined limits, said elements having cooperating surfaces which are engaged when the driving element is moving the driven element in one direction, of a roller which occupies said channel, an arm which carries said roller, and a shaft for turning said arm so that said driven element may be moved beyond the limit to which it is moved in said direction by said driving element, whereby said driving element may idle without contact between said surfaces.

16. The combination with a clutch having a cylindrical driven element which may reciprocate, said element having a circumferentially extending channel, and a cooperating, reciprocating driving element for moving said driven element back and forth between predetermined limits, of means independent of said driving element for moving said driven element, said means including an arm having a lateral extension which occupies said channel, a shaft which carries said arm, means for turning said shaft, and means for mounting said shaft at such an angle that as said arm is turned said lateral extension will be caused to travel along a substantially helical path and in so doing maintain contact with the walls of said channel.

17. The combination with a clutch having a cylindrical driven element which may reciprocate, said element having a circumferentially extending channel, and a cooperating, reciprocating driving element for moving said driven element back and forth between predetermined limits, of means independent of said driving element for moving said driven element, said means including a roller which occupies said channel, an arm which carries said roller, a shaft to which said arm is fixed, means for turning said shaft, and means for mounting said shaft at such an angle that as said arm is turned said roller will be caused to travel along a substantially helical path and in so doing maintain contact with the walls of said channel.

18. The combination with a clutch having a cylindrical driven element which may reciprocate, said element having a circumferentially extending channel, and a cooperating, reciprocating driving element for moving said driven element back and forth between predetermined limits, said elements having cooperating surfaces which are engaged when the driving element is moving the driven element in one direction, of means independent of said driving element for moving said driven element in the opposite direction, said means including an arm having a lateral extension which occupies said channel, a shaft which carries said arm, means for turning said shaft, and means for mounting said shaft at such an angle that as said arm is turned said lateral extension will be caused to travel along a substantially helical path and in so doing maintain contact with the walls of said channel, the means for turning said shaft also being operative to move said driven element beyond the limit to which it is moved by said cooperating surfaces, whereby said driving element may idle without contact between said cooperating surfaces.

19. The combination with a clutch having a cylindrical driven element which may reciprocate, said element having a circumferentially extending channel and a cooperating, reciprocating driving element for moving said driven element back and forth between predetermined limits, said elements having cooperating surfaces which are engaged when the driving element is moving the driven element in one direction, of means independent of said driving element for moving said driven element in the opposite direction, said means including a roller which occupies said channel, an arm which carries said roller, a lever for turning said shaft, and means for mounting said shaft at such an angle that as said arm is turned said roller will be caused to travel along a substantially helical path and in so doing maintain contact with the walls of said channel, said lever also being operative to move said driven element beyond the limit to which it is moved by said cooperating surfaces, whereby said driving element may idle without contact between said cooperating surfaces.

20. The combination with a clutch having a driven element which reciprocates and which is formed with a transversely extending contact surface, and a cooperating, reciprocating driving element for moving said driven element back and forth between predetermined limits, said elements having cooperating areas which are engaged when the driving element is moving the driven element in the direction of one of said limits, of a pivotally mounted arm having an end which engage said contact surface, and means for turning said arm past dead center to move said driven element beyond said last mentioned limit and lock it in such position.

PAUL H. TAYLOR.

REFERENCES CITED

The following references are of record in the file of this patent:

UNITED STATES PATENTS

| Number | Name | Date |
|---|---|---|
| 449,087 | Prest | Mar. 24, 1891 |
| 2,036,619 | Brown et al. | Apr. 7, 1936 |
| 2,071,235 | Newman | Feb. 16, 1937 |